United States Patent [19]

Ekeleme, Jr. et al.

[11] 4,226,261
[45] Oct. 7, 1980

[54] RELIEF VALVE

[75] Inventors: Charles E. Ekeleme, Jr.; Donald L. Richards, both of Durham, N.C.

[73] Assignee: Eaton Corporation, Cleveland, Ohio

[21] Appl. No.: 12,685

[22] Filed: Feb. 16, 1979

[51] Int. Cl.³ ............................................. F16K 17/20
[52] U.S. Cl. ..................................... 137/469; 137/477
[58] Field of Search ............... 137/469, 475, 476, 477, 137/478

[56] References Cited

U.S. PATENT DOCUMENTS

| 3,074,425 | 1/1963 | Kikendall | 137/477 |
|---|---|---|---|
| 3,189,040 | 6/1969 | Johnson | 137/469 |
| 3,422,840 | 1/1969 | Bryant | 137/469 X |
| 3,702,141 | 11/1972 | Wetterhorn | 137/469 |
| 4,036,250 | 7/1977 | Dashner | 137/478 X |

Primary Examiner—Harold W. Weakley
Attorney, Agent, or Firm—R. J. McCloskey; F. M. Sajovec, Jr.

[57] ABSTRACT

A pressure relief valve (10) including a valve stem (34) having an elastomeric valve element (36) received in a counterbore (38) formed in one end thereof and engageable with a valve seat (32) formed in the body (12) of the valve. An annular channel (58) is formed in the valve body surrounding the valve seat, and the valve element is recessed below the outer edge of the counterbored end of the valve stem, such that a thin, annular wall section (39) defined by the difference between the diameter of the counterbore and the outer diameter (40) of the valve stem, extends downward into the annular channel when the valve is closed.

The outer diameter of the counterbored end of the valve stem is substantially smaller than the inner diameter (22) of the main valve chamber to define an annular fluid escape passage (64) and a lip is formed on the valve stem above the counterbored end to guide the valve stem in the main valve chamber. The relationships defined by the valve stem diameter, the annular channel surrounding the valve seat, the inside diameter of the main valve chamber, and the placement of the valve element within the valve stem, permit the valve to pop open when the set pressure is reached, and to reseat at a pressure near the set pressure.

4 Claims, 3 Drawing Figures

RELIEF VALVE

The present invention relates to pressure relief valves, and more particularly to a poppet type relief valve with improved reseating characteristics.

An inherent problem in the design of high-lift poppet type relief valves is a large differential between opening and reseat pressures as a result of the large area differential required to generate sufficient upward force to fully lift the valve.

In general, to obtain good popping action prior art relief valves have relied on accumulating the fluid which escapes from the valve when it first cracks open by limiting the escape passage for the fluid, the pressure which thus builds up augmenting the force tending to unseat the valve and moving it quickly to its full open position. However, in order for the valve to reseat at a pressure reasonably close to the pressure at which the valve first cracks open, the area of the escape passage must be large enough when the valve is wide open so that the pressure of the escaping fluid tending to hold the valve element open will not build up to such a degree that the valve won't reseat until the operating pressure has dropped off considerably lower than the pressure at which it is desirable for the valve to close.

It is difficult to produce a production relief valve which will both sufficiently limit the area of the escape passage for the accumulated fluid until after the valve has opened a substantial amount to provide a low operating differential, and at the same time cause such area to be sufficiently large when the valve is wide open to make the valve reseat at a pressure that is close to the unseating pressure.

Prior art solutions to the above problem include multiple piece poppet elements and combined poppet element and diaphragm valves; however, these can be complex and costly to produce.

The present invention solves the above problems by providing a relief valve having a relatively small diameter poppet member in relation to the valve bore, but further providing a channel or trepanned area adjacent the valve seat into which a portion of the poppet element extends when the valve is closed. This construction has the effect of providing a close clearance between the poppet element of the valve bore, which at this point is the outer wall of the channel, thus permitting the valve to "pop" open, while at the same time providing an unrestricted flow path when the valve is open to allow the valve to reseat at a pressure which is very close to the unseating pressure.

Other features and advantages of the invention will become apparent from the detailed description in connection with the drawings, wherein.

Figure 1:
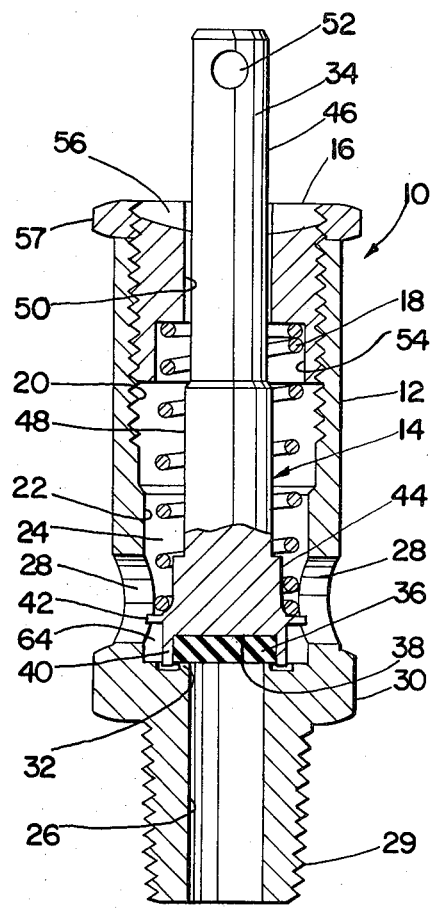
FIG. 1 is a sectional view of a relief valve constructed in accordance with the invention, shown in a closed position.
Figure 2:
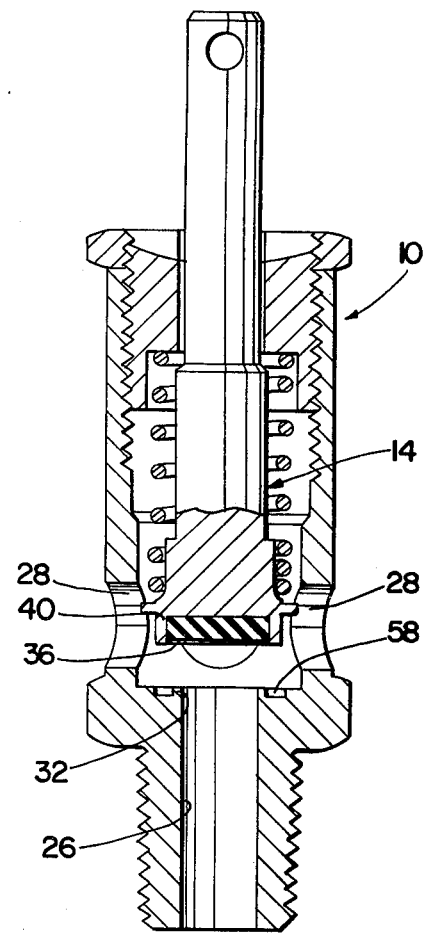
FIG. 2 is a sectional view similar to FIG. 1, but showing the relief valve in its open position.

Referring to FIG. 1, there is illustrated a relief valve, designated generally by the numeral 10, comprising a generally cylindrical valve body 12, a poppet assembly 14 received within the valve body, a spring retainer 16 received over the poppet assembly 14 and threadedly received in the valve body 12, and a compression spring 18 acting between the spring retainer 16 and the poppet assembly 14.

A stepped bore is formed axially through the valve body, including a first relatively large diameter portion 20 into which the spring retainer 16 is threaded, an intermediate diameter portion 22 which defines a main valve chamber 24, and a relatively small diameter inlet bore portion 26. A plurality of radial holes 28 are formed through the valve body to define exhaust ports opening outward from the main valve chamber 24.

The valve body 12 is threaded at its inlet end 29 for attachment to a tank or pipe fitting or the like, and a hexagonal section 30 is formed thereon to facilitate attachment. A valve seat 32 is defined by the intersection of the inlet bore 26 and the intermediate bore 22.

The poppet assembly 14 comprises an elongated cylindrical stem member 34, and an elastomeric disc valve element 36 which is received in a counter bore 38 formed in one end of the stem 34. The valve element 36 can be attached to the stem by any convenient means, such as by bonding or by means of an interference fit within the counterbore.

The stem member 34 has a first diameter portion 40 which is slightly larger than the diameter of the counterbore 38 to define a thin wall section 39, a second diameter portion 42 in the form of an annular projection or lip which is slightly smaller than the intermediate diameter bore 22 to guide the stem in the bore, a third diameter portion 44 which serves to locate the spring 18, and a fourth diameter portion 46 which extends through the spring retainer 16. A fifth diameter portion 48 may also be provided between the diameter 44 and 46, which is slightly larger than the bore 50 through the spring retainer 16 to limit upward movement of the valve stem. A cross hole 52 is formed at the outer end of the stem for attachment of a lever or the like for manual opening of the valve.

The spring retainer 16 has a counterbore 54 formed therein to position one end of the spring 18. In the embodiment illustrated a screwdriver slot 56 is formed in the outer end of the spring retainer to facilitate installation and adjustment. A locknut 57 can be added to the spring retainer to maintain its position within the valve body 12. The valve can be adjusted to a predetermined unseating pressure by varying the depth to which the spring retainer 16 is threaded into the valve body 12, thus varying the preload on the spring 18. Once set, the spring retainer can be locked in place by means of the locknut 57.

Figure 3:
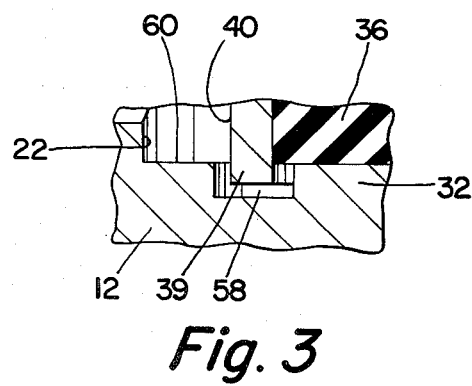
FIG. 3 is an enlarged fragmentary sectional view of a portion of the relief valve.

Referring particularly to FIG. 3, which shows an enlarged view of the area of the valve including the lower end of the poppet assembly 34 and the valve seat 32, the diameter 40 is substantially smaller than the diameter 22 of the main valve chamber 24 such that the relieved fluid does not tend to get trapped beneath the valve in the valve chamber when the valve is open, thus allowing the valve member to reseat at a pressure which is only slightly lower than the set pressure.

Ordinarily, such a relationship between the valve stem diameter and the diameter of the valve chamber would make it essentially impossible for the valve to pop open. However, as illustrated by the enlarged section shown in FIG. 3, the present valve includes novel structure which permits both popping of the valve and a reseat pressure close to the set pressure. Specifically, a channel or trepanned area 58 is formed in the face 60 defined by the intersection of bores 22 and 26, surrounding the valve seat 32; and the elastomeric valve element 36 is recessed within the counterbore 38 so that when the valve is closed a portion of the annular wall section 39 defined by the counterbore diameter and the diameter 40 extends into the channel. The channel 58 is disposed inwardly from the wall of the valve chamber 24, and there is minimal clearance between the diameter 40 and the outside diameter of the channel. The effect of this structure is that when the valve first starts to crack open, that is, when the fluid pressure at the inlet 26 is high enough to overcome the spring force and lift the valve element 36 off the seat 32, fluid will momentarily tend to become trapped within the channel and, since the fluid at this point is acting against the relatively large diameter 40, the valve will pop open.

Once the valve pops open, the relatively unrestricted relief passage 64 defined between diameters 22 and 40 permits the free flow of relieved fluid through the exhaust ports 28. Also, once the valve pops, fluid acting against the underside of the lip 42, also aids in lifting the valve to its full open position.

The lip 42 is located axially on the valve stem 34 such that when the valve is closed at least about twenty percent (20%) of the cross-sectional area of each of the exhaust ports 28 is open to the relief passage 64. The relationship between the axial locations of the fifth diameter portion 48 and the lip 42 is such that when the valve is in its full open position at least a portion of the cross-sectional area of each exhaust port 28 will be open to the portion of the chamber 24 above the lip.

In practice it has been found that for optimum performance, in a nominal half-inch size valve, the clearance between the diameter 40 and the diameter 22 should be at least 0.067 in. (1.7 mm), the depth of the channel 58 should be at least 0.025 in. (0.635 mm), and the clearance between the diameter 40 and the outside diameter of the channel 58 should be no more than 0.023 in. (0.584 mm).

We claim:

1. In a relief valve comprising a body having an inlet port formed therein, a chamber intersecting said inlet port, a valve seat defined by the intersection of said inlet port with said chamber, a valve poppet assembly disposed within said chamber and movable between a first position in engagement with said valve seat and a second position out of engagement with said valve seat, at least one exhaust port formed through said body leading radially outward from said chamber, a spring biasing said poppet assembly into engagement with said valve seat, said spring being enclosed by said body, and an annular channel formed in said body surrounding said valve seat; the improvement wherein said poppet assembly comprises a cylindrical stem member; a counterbore formed in an end of said stem member, the diameter of said counterbore being slightly smaller than the diameter of said end to define a thin annular wall section therebetween; a resilient valve element received in said counterbore and engageable with said valve seat, the thickness of said valve element being somewhat less than the depth of said counterbore such that the annular wall section extends beyond the outer face of said valve element and into said annular channel when said poppet element is in its first position; a radially extending annular lip formed on said stem member and spaced above said end thereof to define a chamber within said valve body above said lip, the outer diameter of said lip being slightly smaller than the inside diameter of said chamber to define a sliding fit therebetween; and means for limiting movement of said valve stem in a direction out of engagement with said valve seat, the relationship between the axial location of said lip and said at least one exhaust port being such that at least a portion of the cross-section area of said at least one exhaust port is open to said chamber above said lip when said valve stem is in its maximum position out of engagement with said valve seat.

2. Apparatus as claimed in claim 1 in which the outer diameter of said annular wall section is substantially smaller than the inside diameter of said chamber to define an annular fluid escape passage therebetween.

3. Apparatus as claimed in claim 1 in which said lip is located on said valve stem and said exhaust ports are located in said body such that at least 20% of the cross-sectional area of each exhaust port is open to said annular fluid escape passage when said valve stem is in its first position.

4. Apparatus as claimed in claim 1 including means threadedly received in said body for retaining one end of said spring, said retaining means having an axial bore formed therethrough through which an end of said valve stem extends, and said means for limiting movement of said valve stem comprising a section of said valve stem of a diameter larger than the diameter of said axial bore.

* * * * *